US006939057B2

(12) United States Patent
Beier et al.

(10) Patent No.: US 6,939,057 B2
(45) Date of Patent: Sep. 6, 2005

(54) OPTICAL COUPLING UNIT AND METHOD FOR INSERTING OPTICAL WAVE GUIDES INTO AN OPTICAL COUPLING UNIT

(75) Inventors: Axel Beier, Schildow (DE); Hans-Dieter Weigel, Caputh (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/485,240

(22) PCT Filed: Aug. 1, 2001

(86) PCT No.: PCT/DE01/02914

§ 371 (c)(1), (2), (4) Date: Jul. 15, 2004

(87) PCT Pub. No.: WO03/012511

PCT Pub. Date: Feb. 13, 2003

(65) Prior Publication Data

US 2004/0247257 A1 Dec. 9, 2004

(51) Int. Cl.[7] .................................................. G02B 6/36

(52) U.S. Cl. ............................ 385/89; 385/90; 385/91; 385/92

(58) Field of Search ...................... 385/53–94, 134–137

(56) References Cited

U.S. PATENT DOCUMENTS

| | | | | | |
|---|---|---|---|---|---|
| 4,233,724 | A | | 11/1980 | Bowen et al. | |
| 5,170,455 | A | * | 12/1992 | Goossen et al. | 385/89 |
| 5,420,954 | A | * | 5/1995 | Swirhun et al. | 385/92 |
| 5,436,999 | A | * | 7/1995 | Brehm et al. | 385/95 |
| 5,548,675 | A | * | 8/1996 | Shigematsu et al. | 385/80 |
| 5,815,621 | A | * | 9/1998 | Sakai et al. | 385/80 |
| 6,062,740 | A | * | 5/2000 | Ohtsuka et al. | 385/81 |
| 6,118,917 | A | * | 9/2000 | Lee et al. | 385/49 |
| 6,168,317 | B1 | * | 1/2001 | Shahid | 385/71 |
| 6,250,820 | B1 | * | 6/2001 | Melchior et al. | 385/89 |
| 6,519,406 | B1 | * | 2/2003 | Fukuyama et al. | 385/137 |
| 6,637,947 | B2 | * | 10/2003 | Melchior et al. | 385/88 |

FOREIGN PATENT DOCUMENTS

| | | |
|---|---|---|
| EP | 0 644 442 A1 | 3/1995 |
| EP | 0 926 522 A2 | 6/1999 |
| EP | 0 953 855 A2 | 11/1999 |
| JP | 09189830 A | 7/1997 |
| WO | WO01/51975 A1 | 1/2001 |

OTHER PUBLICATIONS

International Search Report, for International Application No. PCT/DE01/02914, International Filing Date Aug. 1, 2001, 3 pgs.

* cited by examiner

*Primary Examiner*—Frank G. Font
*Assistant Examiner*—Ryan Lepisto
(74) *Attorney, Agent, or Firm*—Eschweiler & Associates, LLC

(57) ABSTRACT

The invention relates to a coupling unit for optically coupling a multi-channel optical plug-in element to at least one opto-electronic converter of a multi-channel transmitter and/ or receiver unit and to a method for inserting optical wave guides into said optical coupling unit. The coupling unit comprises a first coupling side for optical coupling to the multi-channel optical plug-in element, a second coupling side for optical coupling to the at least one opto-electronic converter and a plurality of receiving openings for optical wave guides; said openings being arranged on a plane, extending from the first coupling side to the second coupling side. According to the invention, the coupling unit is embodied in a single piece and the receiving openings extend at least partially inside the coupling unit. The optical wave guides are inserted into the single-piece coupling unit with the aid of an optical plug-in element. The receiving openings of the optical plug-in element are flush with the receiving elements of the coupling unit.

12 Claims, 6 Drawing Sheets

OPTICAL COUPLING UNIT AND METHOD FOR INSERTING OPTICAL WAVE GUIDES INTO AN OPTICAL COUPLING UNIT

RELATED APPLICATION

This application claims priority to and incorporates by reference International Application No. PCT/DE01/02914 filed Aug. 1, 2001, which is entitled "Optical Coupling Arrangement and Method for Inserting Optical Waveguides into an Optical Coupling Unit", which was not published in English, and which is hereby incorporated by reference in its entirety.

FIELD OF THE INVENTION

The invention relates to a coupling unit for optically coupling a multi-channel optical plug-in element to at least one opto-electronic converter of a multi-channel transmitting and/or receiving unit, and to a method for inserting optical waveguides into a coupling unit of this type.

BACKGROUND OF THE INVENTION

To couple and connect an optical plug-in element, in particular an optical connector, to light-emitting or light-receiving opto-electronic converters, it is known to provide a separate optical coupling unit. In this case, the high-frequency optical signals which are to be transmitted are conducted and guided from the optical connector to the opto-electronic converters and in the opposite direction via the optical coupling unit.

Conventional coupling units of this type comprise a two-part support part in which optical waveguides (glass fibers) arranged in a plane are held in V-shaped grooves of the one part. The optical waveguides are pressed into the grooves by an additional slide, which is provided by the other part. The end surfaces are then polished and guide pins fitted.

The known coupling unit has the disadvantage that the adaptation and fixing of the glass fibers by means of a slide can be achieved only by all of the dimensions having the highest possible accuracy, this being associated with a high outlay and a high reject rate. Also, acceptable positional tolerances between the V-shaped grooves for the optical waveguides and bores for guide pins, which bores are arranged at the side of the V-shaped grooves, can be achieved only with difficulty. High injection molding costs arise due to complicated measurements, tests and adaptations.

A further disadvantage resides in the fact that the guide pins required are relatively expensive pins with an annular projection, the pins being placed into bores for the guide pins with a shaped undercut. Overall, assembly of the known coupling unit, which requires a high outlay on fabrication, is therefore relatively complicated.

Starting from this prior art, the present invention is based on the object of providing an optical coupling unit and a method for inserting optical waveguides into an optical coupling unit of this type, said coupling unit and method making it possible to produce the coupling unit and insert optical waveguides into the coupling unit in a simple manner.

SUMMARY OF THE INVENTION

Accordingly, provision is made for the coupling unit to be of single-piece design, the receiving openings for optical waveguides which are to be introduced into the coupling unit extending at least partially in the interior of the coupling unit. Just a single part is therefore used according to the invention as the coupling unit. In this part are formed the receiving openings for the optical waveguides and longitudinal bores for receiving and positioning guide pins with which the coupling unit can be aligned in a defined manner with respect to other elements, in particular an optical connector.

Production of the coupling unit as one part means that all of the problems which are associated in the prior art with the use of a slide for inserting the optical waveguides no longer apply. In particular, force-controlled assembly is not necessary and the problem of applying uneven pressure to the optical waveguides does not exist. In order to put the optical waveguides in place, the latter are instead inserted into the corresponding receiving openings of the coupling unit, as described further below. There is advantageously also a reduced number of components, so that two injection molds are not required in order to produce the coupling unit.

A further advantage of the solution according to the invention resides in the fact that the receiving openings for the optical waveguides are surrounded on all sides by identical material thicknesses, so that a compact, closed and protected arrangement is provided.

In one preferred refinement of the invention, the coupling unit has, on its upper or lower side, a cutout which is preferably arranged centrally and partially exposes the receiving openings for the optical waveguides. It is possible to place an adhesive for bonding the optical waveguides in the receiving openings into the coupling unit via the cutout.

In one preferred development, the coupling unit is assigned an additional auxiliary part having a knob protruding from an essentially planar surface. In this case, the coupling unit can be arranged on the auxiliary part in such a manner that the knob projects into the cutout of the coupling unit and comes to rest adjacent to the receiving openings for the optical waveguides. The additional auxiliary part serves as an insertion aid and holds down the optical waveguides in the region of the cutout when the latter are being inserted.

The coupling unit preferably has means for receiving and latching guide pins (also referred to as centering pins). These are advantageously two longitudinal bores which extend in each case at the side of the receiving openings for the optical waveguides and have a constriction which serves in each case for the latching of a guide pin. The associated guide pin is preferably provided here with an annular groove which latches in an interlocking manner into the constriction of the longitudinal bore.

In comparison with the previous use of guide pins having thickened sections, the use of guide pins having an annular groove has the advantage of a simpler and more cost-effective method of production. The guide pins are thus preferably produced by means of centerless circular grinding machines, the guide pin being moved axially between two disks rotating in opposite directions. This method also has the advantage of enabling guide pins to be produced with little surface roughness. If the guide pins have a smooth surface, the wear on the coupling partner is advantageously reduced.

In one preferred refinement of the invention, the first coupling side of the coupling unit has the same basic dimensions as the optical plug-in element to be coupled, with, in particular, receiving openings of the optical plug-in element being aligned with the receiving openings for the optical waveguides of the coupling unit. This permits a simple insertion process when placing the optical waveguides into the coupling unit: the optical plug-in element serves as an insertion aid for locating the small, high-precision receiving openings on the first coupling side of the coupling element.

The second coupling side of the coupling unit preferably has a beveled projection exposing the receiving openings. In this case, a beam deflection between the optical waveguides and associated, optically active surfaces of the opto-electronic converter takes place via coupling-side end surfaces of optical waveguides which are placed into the receiving openings.

The optical coupling unit preferably consists of the same material as the optical plug-in element to be coupled. In particular, the optical coupling unit consists of the same material as the waveguide-supporting, optical fiber end piece of the plug-in element (referred to in general as "ferrule"). By adapting the material, an identical coefficient of expansion is provided in the event of temperature changes, so that the quality of the coupling between the coupling unit and optical plug-in element is not affected by temperature changes.

The receiving openings in the coupling unit for the optical waveguides are preferably designed as high-precision bores. In this case, provision may be made for the bores to be of circular design in cross section.

The method according to the invention is distinguished by the following steps:

a) providing a multi-channel optical plug-in element having receiving openings for optical waveguides, said openings being arranged in a plane,
b) arranging the multi-channel optical plug-in element on the first coupling side of the coupling unit in such a manner that the receiving openings of the optical connector element are aligned with the receiving openings of the coupling unit,
c) inserting at least one optical waveguide initially into the optical plug-in element and continuing into the coupling unit, and
d) bonding the optical waveguides in the receiving openings of the coupling unit.

The coupling unit preferably has a cutout in which to place adhesive and is placed during the insertion process onto an additional auxiliary part having a protruding knob in such a manner that the waveguides to be inserted are prevented by the protruding knob from leaving the receiving openings in the region of the cutout. In this case, the auxiliary part provides a type of insertion aid which ensures that the insertion process takes place even in the region of the cutout of the coupling unit and facilitates the fabrication of the glass fibers.

After the insertion process is completed, the optical waveguides are beveled on the second coupling side of the coupling unit in such a manner that their end surfaces cause a beam deflection by 90° between the optical waveguides and optically active zones of opto-electronic converters of a transmitting and/or receiving unit.

A standard MT ferrule is preferably used as the multi-channel optical plug-in element, since this enables existing parts and geometries to be used. In principle, however, any desired optical multi-fiber connector or an auxiliary part analogous thereto can be used as the optical plug-in element.

BRIEF DESCRIPTION OF THE DRAWINGS

The invention will be explained in greater detail below using a number of exemplary embodiments with reference to the figures of the drawing, in which.

DETAILED DESCRIPTION OF THE INVENTION

Figure 1:
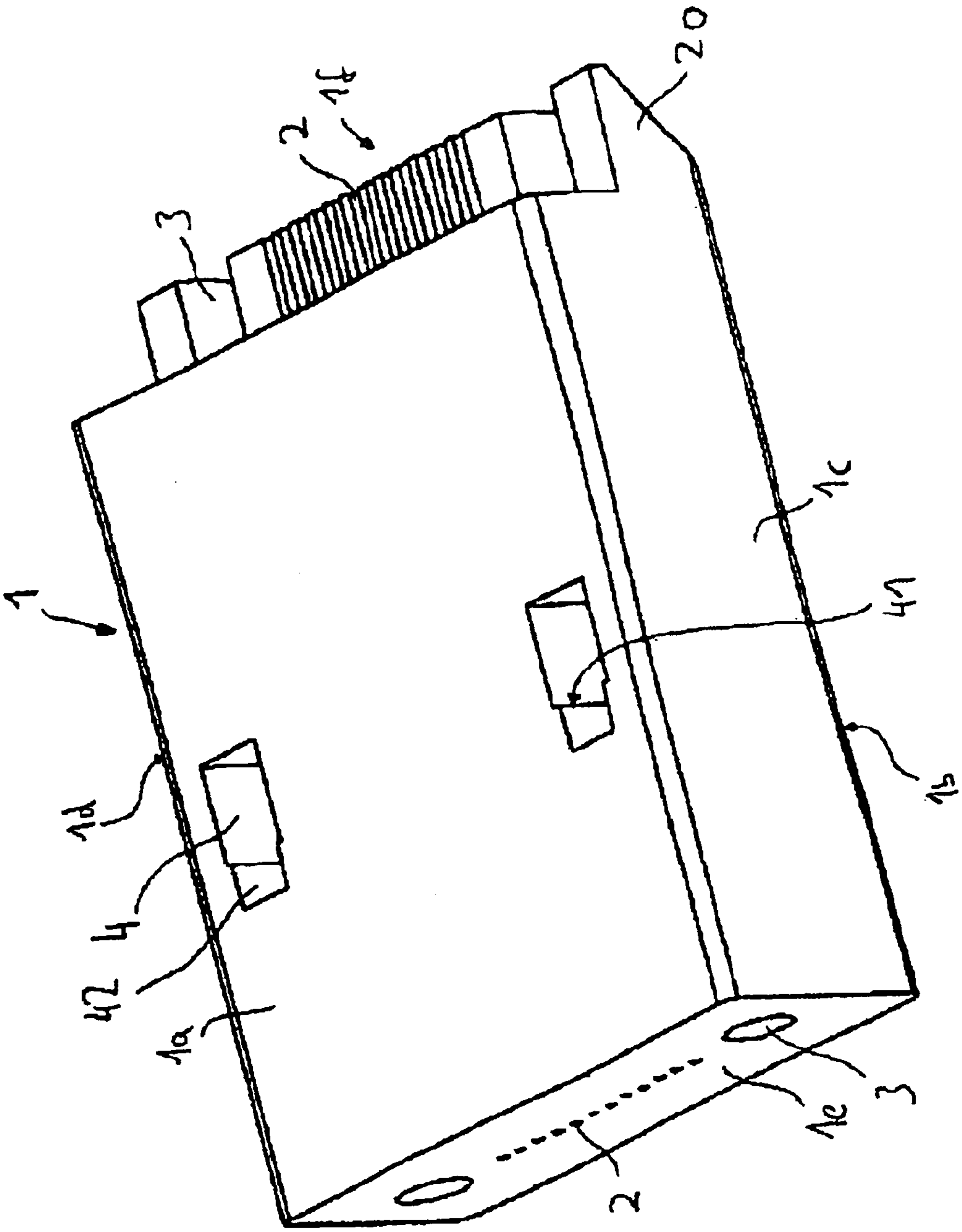
FIG. 1 shows a perspective view of a coupling unit according to the invention.

FIG. 1 shows an exemplary embodiment of a coupling unit 1 for connecting and conducting high-frequency optical signals, which are guided in optical waveguides, between an optical plug-in connector and at least one opto-electronic converter and vice versa.

Figure 6:
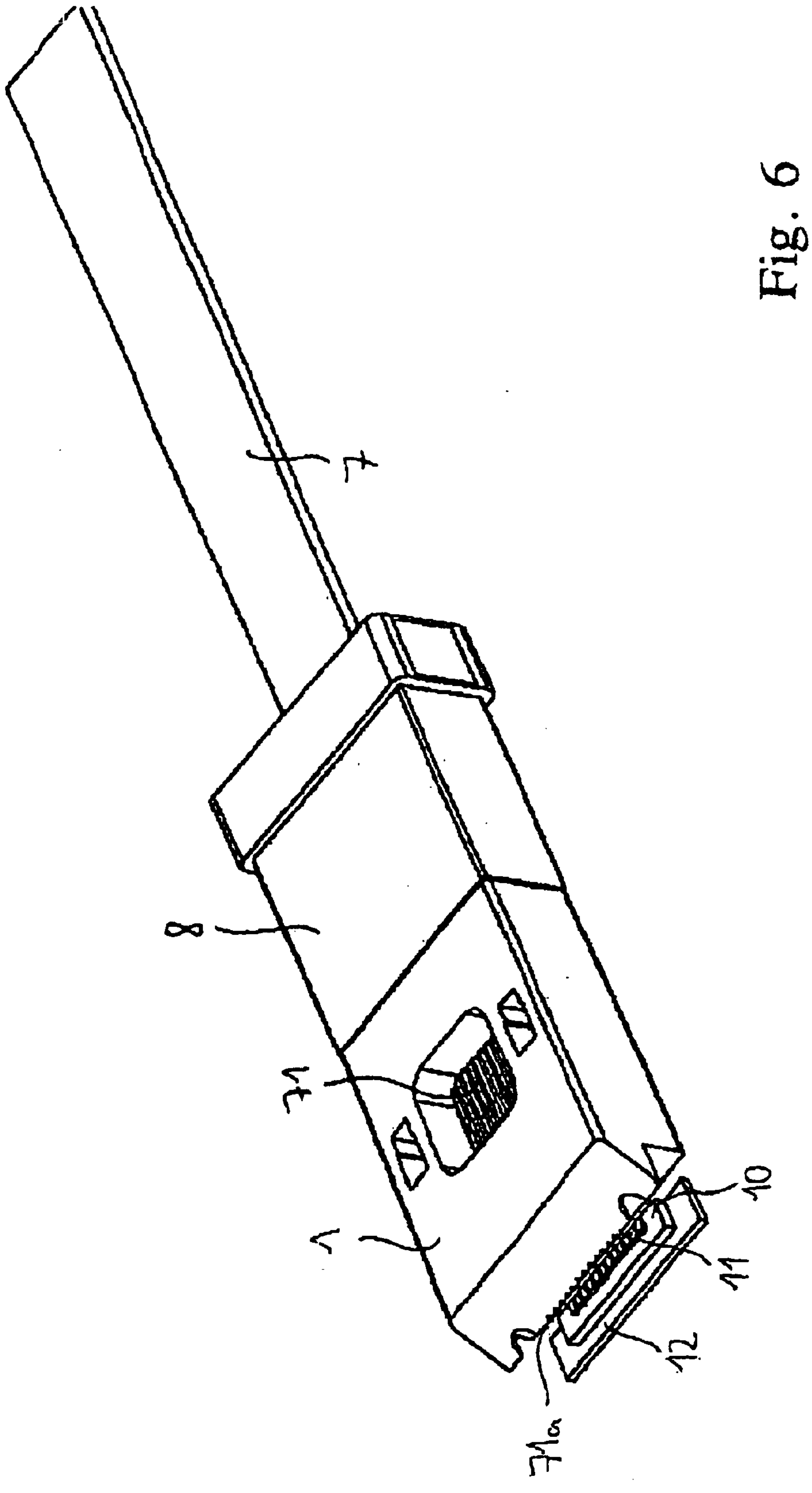
FIG. 6 shows a perspective illustration of an optical connector, a coupling unit and an array of optically electronic converters.

The coupling unit 1 comprises a single-piece shaped plastic body which is provided, for example, by injection molding. The coupling unit has an upper side 1*a,* a lower side 1*b,* two lateral side surfaces 1*c,* 1*d* and a first coupling side 1*e,* which is on the left in FIG. 1, and a second coupling side 1*f,* which is on the right in FIG. 1. As illustrated in FIG. 6, the first coupling side 1*e* serves for coupling to an optical connector and the second coupling side 1*f* serves for the optical coupling to opto-electronic converters of a transmitting and/or receiving unit.

On the second coupling side if, the coupling unit forms a beveled projection 20 exposing the receiving openings 2 while the first coupling side 1*e* has been ground to give a flat surface.

A multiplicity of receiving openings 2, which are preferably designed as bores, extend in parallel in a plane in the coupling unit 1. The bores are produced, for example, during production of the coupling unit by thin wires placed into an injection molding die. Furthermore, the coupling unit 1 has longitudinal bores 3 into which, according to FIGS. 2*a* and 2*b*, are introduced guide pins which serve to align the coupling unit 1 and the receiving openings 2 and waveguides arranged therein with respect to an optical connector or another coupling partner.

Figure 2A:
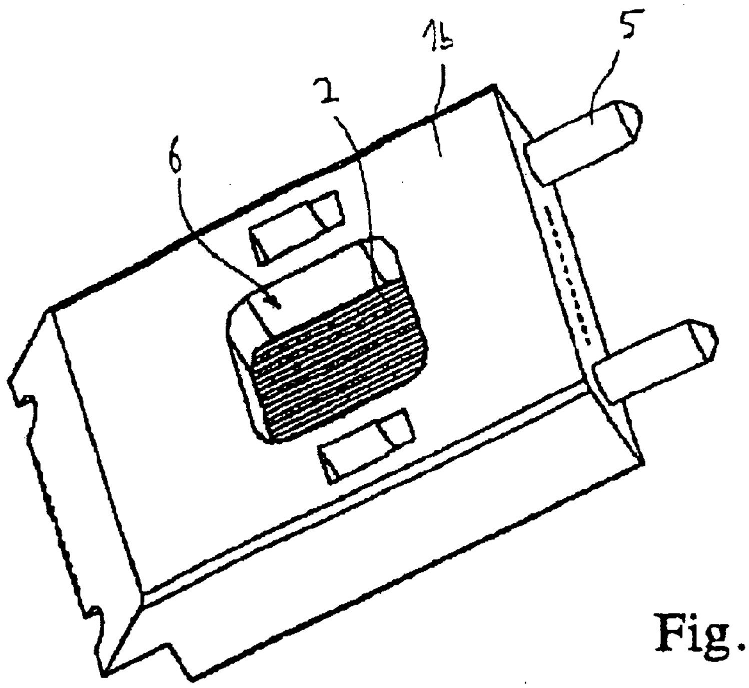
FIG. 2*a* shows a different perspective illustration of the coupling unit of FIG. 1, in which guide pins have been introduced into the coupling unit.
Figure 2B:
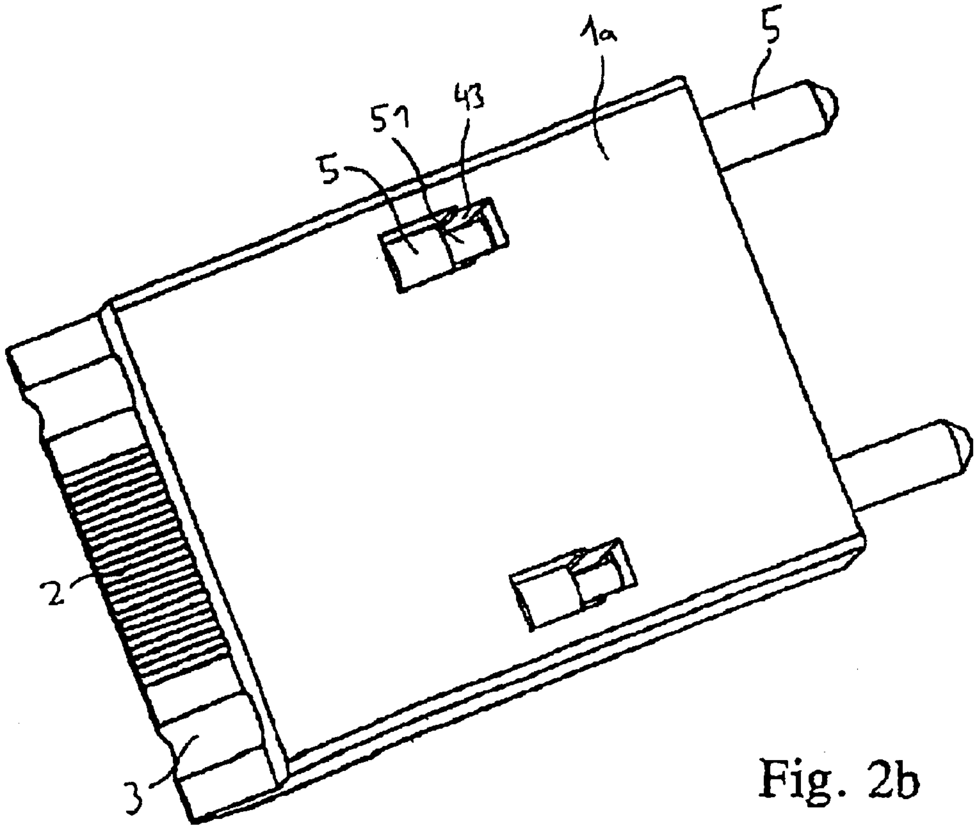
FIG. 2*b* shows a perspective illustration of the coupling unit of FIG. 2*a* from the other side.

Extending vertically from the surface 1*a* of the coupling unit 1 in the direction of the bores 3 are two lateral cutouts 4 which have, at their one end, with two edges 41 being formed, a tapered, narrower region 42 in which the wall of the cutout 4 has a type of thickened section 43 (cf. FIG. 2*b*). As can be seen in FIG. 2*b*, the guide pins which are to be introduced into the bores 3 each have an annular groove 51 which, when the guide pins 5 are inserted from one coupling side, come after a certain introductory distance into abutment against the tapered region 42 having the thickened sections 43 of the vertical openings 4, in which case that region of the guide pins 5 which is adjacent to the groove 51 comes into abutment in an interlocking manner with the edges 41 of the openings 4. During introduction of the guide pins 5, the thickened sections 43 are elastically compressed in the process until the annular groove 51 comes into abutment against the thickened sections 43. The guide pins 5 are thereby retained and fixed in the longitudinal bores 3.

In this case, provision may be made both for the vertical openings 4 to extend from the upper side 1*a*as far as the lower side 1*b* or else to reach only from one side as far as the bore 3.

In FIG. 2*a* it can be seen that a central cutout 6 is provided on the one side 1*b* of the coupling unit 1 and serves, after optical waveguides have been introduced into the receiving openings 2, to receive adhesive and thereby to firmly bond the optical waveguides in the coupling unit 1. For this purpose, the cutout 6 reaches into the region of the receiving openings 2 for the optical waveguides.

Figure 3:
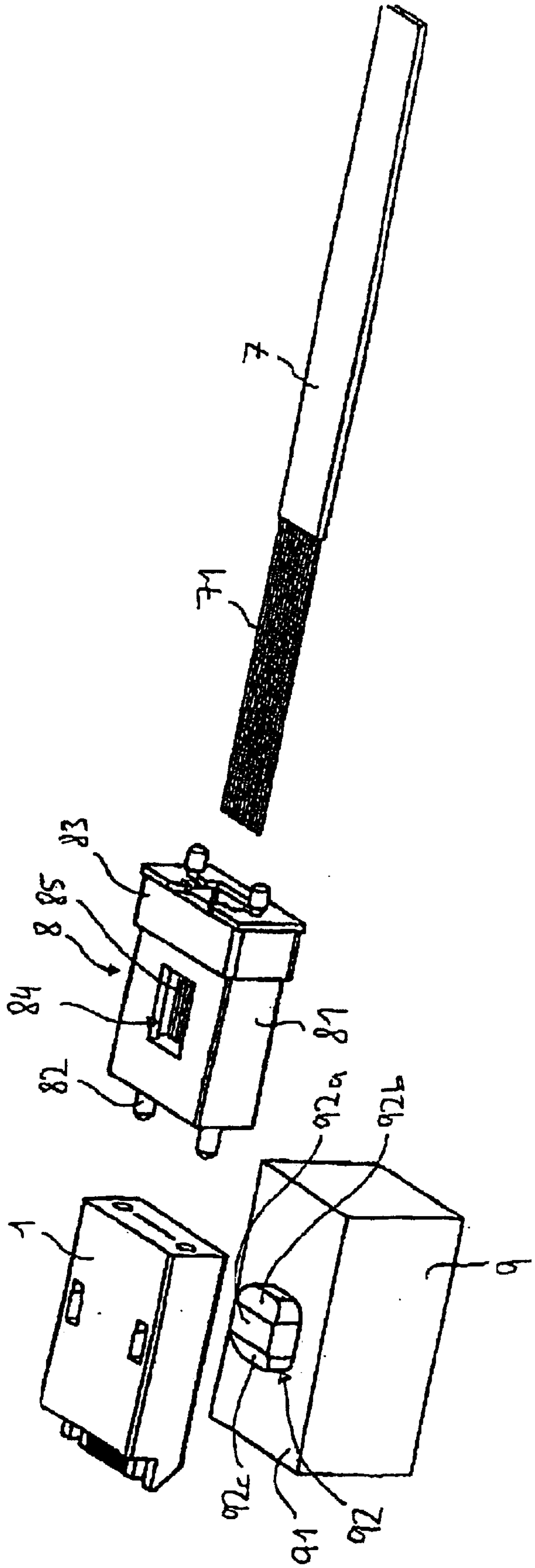
FIG. 3 shows a perspective illustration of a coupling unit, an insertion aid, an optical connector and an optical cable before glass fibers are inserted into the coupling unit.

FIG. 3 shows the elements required for inserting a plurality of optical waveguides of an optical cable into a coupling unit 1. In this case, in addition to the optical cable 7 having a multiplicity of optical waveguides 71, the coupling unit 1 described in FIGS. 1 to 3 and also an unused optical connector 8 and an insertion aid 9 designed as a separate part are provided. The optical connector 8 is preferably a standard connector, for example a standard MT ferrule for receiving twelve optical waveguides.

The coupling unit 8 has, in a manner known per se, a housing 81, two guide pins 82 guided in longitudinal bores, a rear sheet-metal holding element 83 for holding and fixing the guide pins 82, and receiving openings 85 for receiving the optical waveguides 71 of the optical cable 7. A cutout 84 for providing a bonding seal for the glass fibers 71 is also provided. However, in this case, this cutout 84 is not filled with adhesive. The coupling unit 8 serves merely as an insertion aid for the coupling unit 1 and not for fastening the optical waveguides 71.

The centering aid 9 has, on an upper, planar surface 91, a protruding knob 92 which has an upper surface 92*a* arranged parallel to the surface 91, and two angled surfaces 92*b*, 92*c* which are inclined in the direction of the surface 91.

Figure 4:
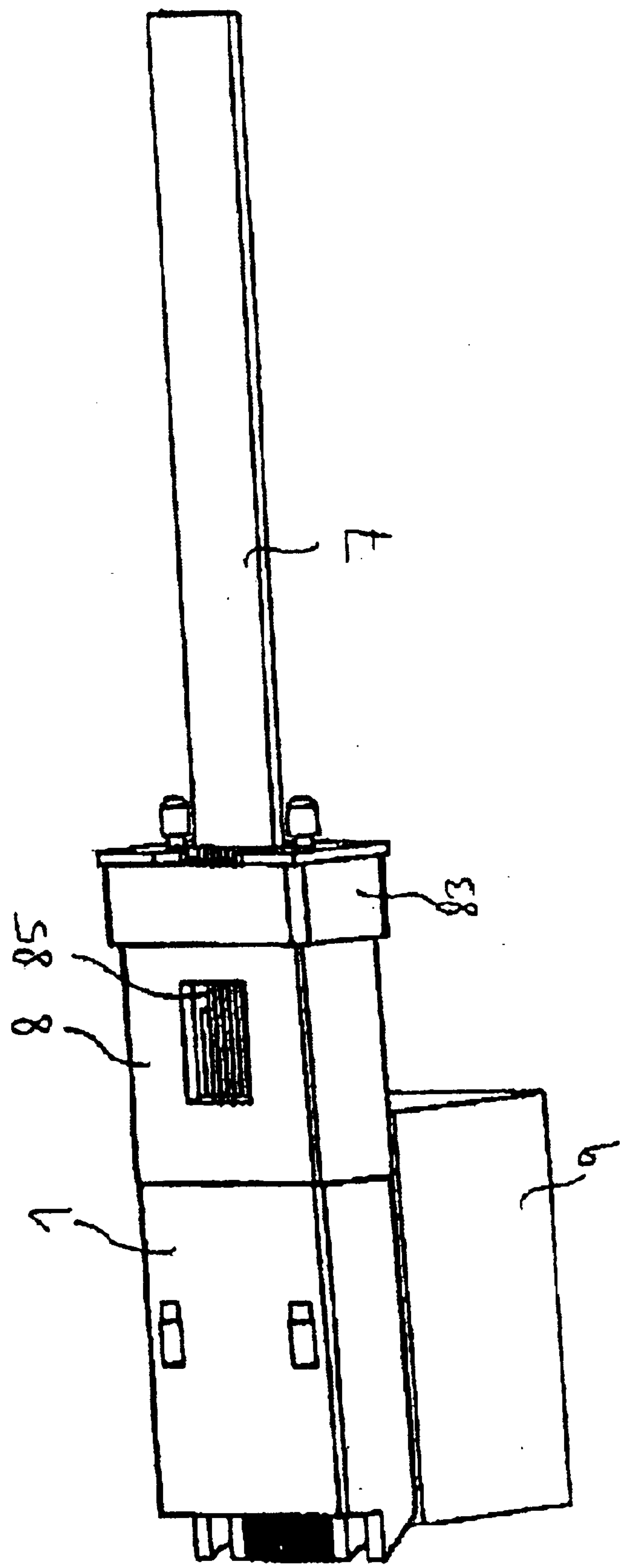
FIG. 4 shows the coupled together elements of FIG. 3 during insertion of the glass fibers.
Figure 5:
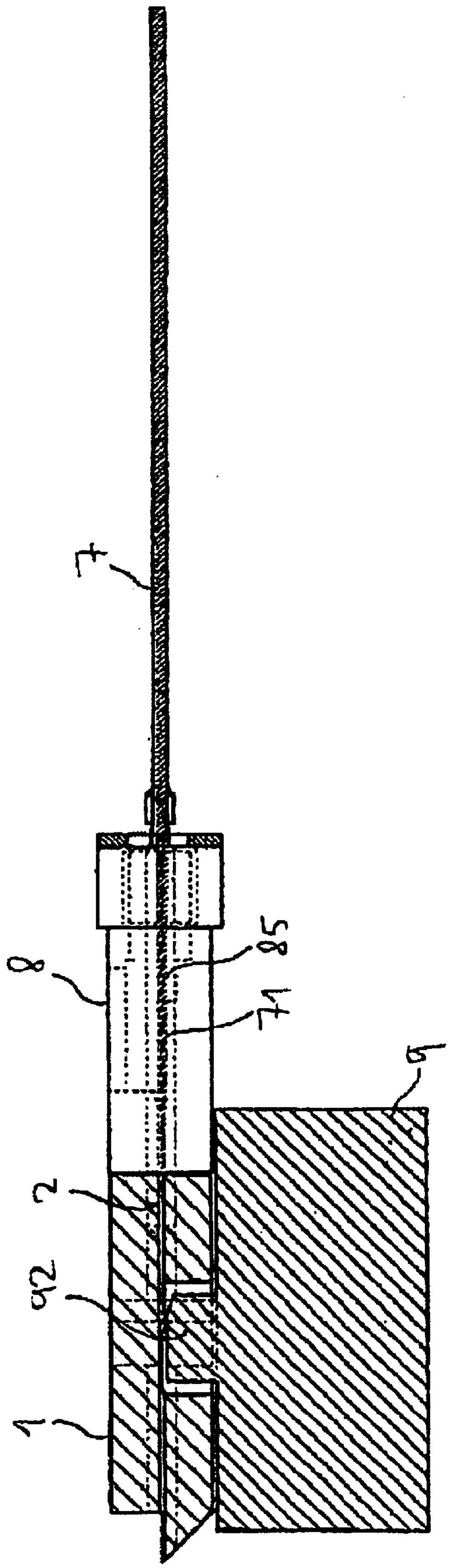
FIG. 5 shows a sectional illustration of the arrangement of FIG. 4.

FIGS. 4 and 5 illustrate the arrangement of elements of FIG. 3 during the insertion of the glass fibers 71 into the optical connector 8 and the coupling unit 1. In this case, the coupling unit 1 sits on the insertion aid 9 in such a manner that the protruding knob 92 of the insertion aid 9 engages in the cutout 6 of the coupling unit 1, specifically approximately as far as the bottom of the cutout of the coupling unit.

The insertion process now proceeds in such a manner that the optical connector 8 is first of all fastened to the first coupling side 1*e* of the coupling unit by means of the guide pins 5 and 82. Owing to identical basic dimensions and by means of the precisely aligned guide pins, coupling takes place in such a manner that the receiving openings 85 of the optical connector 8, which openings receive the optical waveguides 71, are aligned with the receiving openings 2 of the coupling unit 1.

It is pointed out that the guide pins 5, 82 may be arranged either on the optical connector 8 or on the coupling unit 1. However, they are preferably provided on the coupling unit 1 and are fastened there as described with reference to FIG. 2*a*. A secure latching is thus produced by the coupling unit engaging in an interlocking manner in the groove 51 of the guide pin 5. The guide pin 5 can be produced in a simple manner by means of a centerless circular grinding machine. The guide pin 5 has a smooth surface, which reduces the wear of the coupling partner.

According to FIGS. 4 and 5, the optical waveguides 71 are passed through the receiving openings 85 of the optical connector 8 and then through the receiving openings 2 of the coupling unit 1. As can be seen from FIG. 5, the knob 92 engaging in the cutout 6 of the coupling unit ensures that the optical waveguides 71, which are glass fibers, are held down during the insertion process for the following openings.

After the optical waveguides 71 have been inserted, adhesive is poured into the cutout 6 of the coupling unit 1, with the optical waveguides being fixed in place. The optical connector 8 is now removed (for example after severing the optical waveguides) and the end or coupling surfaces 1*e*, if of the coupling unit 1 are polished. The guide pins are then fitted as described in respect of FIG. 2*b* if this has not yet taken place.

FIG. 6 shows all of the essential elements of an arrangement with a finished coupling unit. An optical connector 8 is coupled on the first coupling side 1*e* of the coupling unit 1. It is pointed out here that the optical connector 8 is, unlike in FIGS. 3 to 5, a completely finished connector with optical waveguides placed in it and a polished end surface. The optical connector 8 and the coupling unit 1 consist of the same material, so that there are identical coefficients of expansion if there is a change in temperature, and therefore improved coupling conditions. A receiving and transmitting unit 10 which has an array of optically electronic converters 11 is illustrated on the other coupling side 1*f*. Said converters are fitted on a customary support 12 and connected electrically by means of a bonding process to a printed circuit board (not illustrated). The obliquely ground and polished end surfaces 71*a* of the glass fibers 71 cause the optical signals to be deflected in a manner known per se by 90° and thus to strike against the respectively assigned converters 11. An arrangement of this type is described, for example, in U.S. Pat. No. 6,250,820. B1.

What is claimed is:

1. A coupling arrangement for optically coupling a multichannel optical plug-in element to at least one optoelectronic converter of a multi-channel transmitting or receiving unit, the coupling arrangement comprising:

a coupling unit which comprises:

a first coupling side for optical coupling to the multichannel optical plug-in element, a second coupling side lying opposite the first coupling side for optical coupling to the at least one optoelectronic converter, and a multiplicity of high-precision through-bores for optical waveguides, said through-bores being arranged in a plane and extending from the first coupling side to the second coupling side in the interior of the coupling unit, wherein the coupling unit is of single-piece design, the coupling unit has, on its upper or lower side, a cut-out which partially exposes the through-bores for the optical waveguides in the interior, and the coupling arrangement furthermore comprises an additional auxiliary part which can be removed from the coupling unit and has a protruding knob configured for the coupling unit to be arranged on the auxiliary part after manufacture of the coupling unit in such a manner that the knob projects into the cut-out of the coupling unit and comes to rest adjacent to the through-bores for the optical waveguides and prevents the optical waveguides from leaving the through-bores in the region of the cut-out.

2. The coupling arrangement as claimed in claim 1, the coupling unit comprises two longitudinal bores for receiving and latching guide pins which each extend at the side of the through-bores for the optical waveguides, and the longitudinal bores each have, in an elastic wall region, a constriction which serves in each case for the latching of a guide pin.

3. The coupling arrangement as claimed in claim 1, further comprising guide pins which are introduced into the longitudinal bores of the coupling unit, wherein the guides pins have an annular groove, the annular groove of the guide pins bearing in each case in the constriction of a longitudinal bore.

4. The coupling arrangement of claim 1, wherein the first coupling side has the same basic dimensions as an end side of the optical plug-in element to be coupled, with through-bores of the optical plug-in element being aligned with the receiving openings through-bores of the coupling unit.

5. The coupling arrangement of claim 1, wherein the second coupling side has a beveled projection exposing the receiving openings.

6. The coupling arrangement of claim 1, wherein the coupling unit comprises a plastic shaped body.

7. The coupling arrangement of claim 1, wherein the additional auxiliary part has a planar surface and a knob protruding from the planar surface.

8. The coupling arrangement as claimed in claim 7, wherein the knob has an upper surface arranged parallel to the planar surface and two angled surfaces inclined in the direction of the planar surface.

9. A method for inserting glass fibers into an optical coupling unit which comprises a single-piece design having a first coupling side, a second coupling side lying opposite the first coupling side and a plurality of high-precision through-bores for accommodating optical waveguides, which bores are arranged in a plane and extend in an interior of the coupling unit from the first coupling side to the second coupling side, comprising:

a) providing a separate multi-channel optical plug-in element having receiving openings for optical waveguides, said openings being arranged in a plane, b) arranging the multi-channel optical plug-in element on the first coupling side of the coupling unit in such a manner that the receiving openings of the optical plug-in element are aligned with the through-bores of the coupling unit, c) inserting at least one optical waveguide initially into the optical plug-in element and continuing into the coupling unit, and d) bonding the optical waveguides in the through-bores of the coupling unit).

10. The method as claimed in claim 9, wherein the multi-channel optical plug-in element comprises a standard MT ferrule.

11. The method as claimed in claim 9, wherein the multi-channel optical plug-in element is removed from the arrangement with respect to the coupling unit after the optical waveguides have been bonded in the through-bores of the coupling unit.

12. A coupling arrangement for optically coupling a multi-channel optical plug-in element to at least one opto-electronic converter of a multi-channel transmitting or receiving unit or to a multi-channel optical waveguide, the coupling arrangement comprising:

a coupling unit which comprises:

a first coupling side for optical coupling to the multi-channel optical plug-in element, a second coupling side lying opposite the first coupling side for optical coupling to the at least one opto-electronic converter or the multi-channel optical waveguide, and a multiplicity of high-precision through-bores for optical waveguides, said through-bores being arranged in a plane and extending from the first coupling side to the second coupling side in the interior of the coupling unit, wherein the coupling unit is of single-piece design, the coupling unit has, on its upper or lower side, a cut-out which partially exposes the through-bores for the optical waveguides in the interior, and the coupling arrangement furthermore comprises an additional auxiliary part which can be removed from the coupling unit and has a protruding knob configured for the coupling unit to be arranged on the auxiliary part after manufacture of the coupling unit in such a manner that the knob projects into the cut-out of the coupling unit and comes to rest adjacent to the through-bores for the optical waveguides and prevents the optical waveguides from leaving the through-bores in the region of the cut-out.

* * * * *